(12) United States Patent
Li

(10) Patent No.: US 11,366,271 B2
(45) Date of Patent: Jun. 21, 2022

(54) OPTICAL COMMUNICATION MODULE OF REDUCED SIZE UTILIZING ONE BIREFRINGENT CRYSTAL TO SEPARATE LIGHT SIGNALS

(71) Applicant: SHUNSIN TECHNOLOGY (ZHONG SHAN) LIMITED, Zhongshan (CN)

(72) Inventor: Chun-Feng Li, Zhongshan (CN)

(73) Assignee: SHUNYUN TECHNOLOGY (ZHONG SHAN) LIMITED, Zhongshan (CN)

( * ) Notice: Subject to any disclaimer, the term of this patent is extended or adjusted under 35 U.S.C. 154(b) by 22 days.

(21) Appl. No.: 17/116,821

(22) Filed: Dec. 9, 2020

(65) Prior Publication Data

US 2021/0191045 A1 Jun. 24, 2021

(30) Foreign Application Priority Data

Dec. 23, 2019 (CN) .......................... 201911339933.2

(51) Int. Cl.
*G02B 6/30* (2006.01)
*G02B 6/126* (2006.01)
*G02B 6/42* (2006.01)
*G02B 6/12* (2006.01)

(52) U.S. Cl.
CPC ............... *G02B 6/30* (2013.01); *G02B 6/126* (2013.01); *G02B 6/12007* (2013.01); *G02B 6/4214* (2013.01)

(58) Field of Classification Search
CPC ...... G02B 6/30; G02B 6/12007; G02B 6/126; G02B 6/4214

USPC .......................................................... 385/14
See application file for complete search history.

(56) References Cited

U.S. PATENT DOCUMENTS

| 5,499,307 A * | 3/1996 | Iwatsuka ................ G02B 6/272 |
| | | 359/489.08 |
| 5,911,018 A | 6/1999 | Bischel et al. |
| 6,546,160 B1 * | 4/2003 | Schunk .................... H04J 14/02 |
| | | 385/24 |
| 7,729,569 B2 * | 6/2010 | Beer ..................... G02B 6/4204 |
| | | 385/33 |
| 9,874,691 B2 | 1/2018 | Mahgerefteh et al. |
| 2022/0035100 A1 * | 2/2022 | Muranaka ................ G02B 6/42 |

FOREIGN PATENT DOCUMENTS

| CN | 101216582 A | 7/2008 |
| CN | 101344625 A | 1/2009 |
| CN | 102004326 A | 4/2011 |
| CN | 102183828 A | 9/2011 |

(Continued)

*Primary Examiner* — Jerry M Blevins
(74) *Attorney, Agent, or Firm* — ScienBiziP, P.C.

(57) ABSTRACT

An optical communication module separating the input and output of light signals by birefringence includes first and second planar optical waveguides with a birefringent crystal connected to both. An optical fiber is adjacent to the second planar optical waveguide. An output beam from a transmitter passes through the first planar optical waveguide, the birefringent crystal, and the second planar optical waveguide in sequence, and enters into the optical fiber. An incoming beam from the optical fiber passes through the second planar optical waveguide, the birefringent crystal, and the first planar optical waveguide in sequence, and then falls onto a receiver.

8 Claims, 3 Drawing Sheets

(56) References Cited

FOREIGN PATENT DOCUMENTS

| | | |
|---|---:|---|
| CN | 1735822 B | 10/2011 |
| CN | 102854564 A | 1/2013 |
| CN | 103326784 A | 9/2013 |
| CN | 104133273 A | 11/2014 |
| CN | 104950407 A | 9/2015 |
| CN | 109154700 A | 1/2019 |
| CN | 110308528 A | 10/2019 |
| TW | 201323960 A | 6/2013 |
| TW | 201907190 A | 2/2019 |

\* cited by examiner

OPTICAL COMMUNICATION MODULE OF REDUCED SIZE UTILIZING ONE BIREFRINGENT CRYSTAL TO SEPARATE LIGHT SIGNALS

FIELD

The present disclosure relates to optical communications, especially an optical communication module with birefringent crystal.

BACKGROUND

An optical communication network has the characteristics of low transmission loss, high data confidentiality, total immunity to electromagnetic interference (EMI), wide bandwidth, and is a major communication method today. The optical communication module is an important basic component in optical communication technology. The optical communication module receives optical signals and converts the optical signals into electrical signals. The optical communication module can also convert electrical signals into optical signals, and then transmit the optical signals outward.

The optical communication module has a complex optical system so that the optical communication module can use the same optical fiber to output and receive input of optical signals.

However, the conventional single-fiber bidirectional optical communication module has many optical components inside, which increases the manufacturing cost of the optical communication module. Alignment and fixation between the optical components also increases the difficulty of manufacturing the optical communication module.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
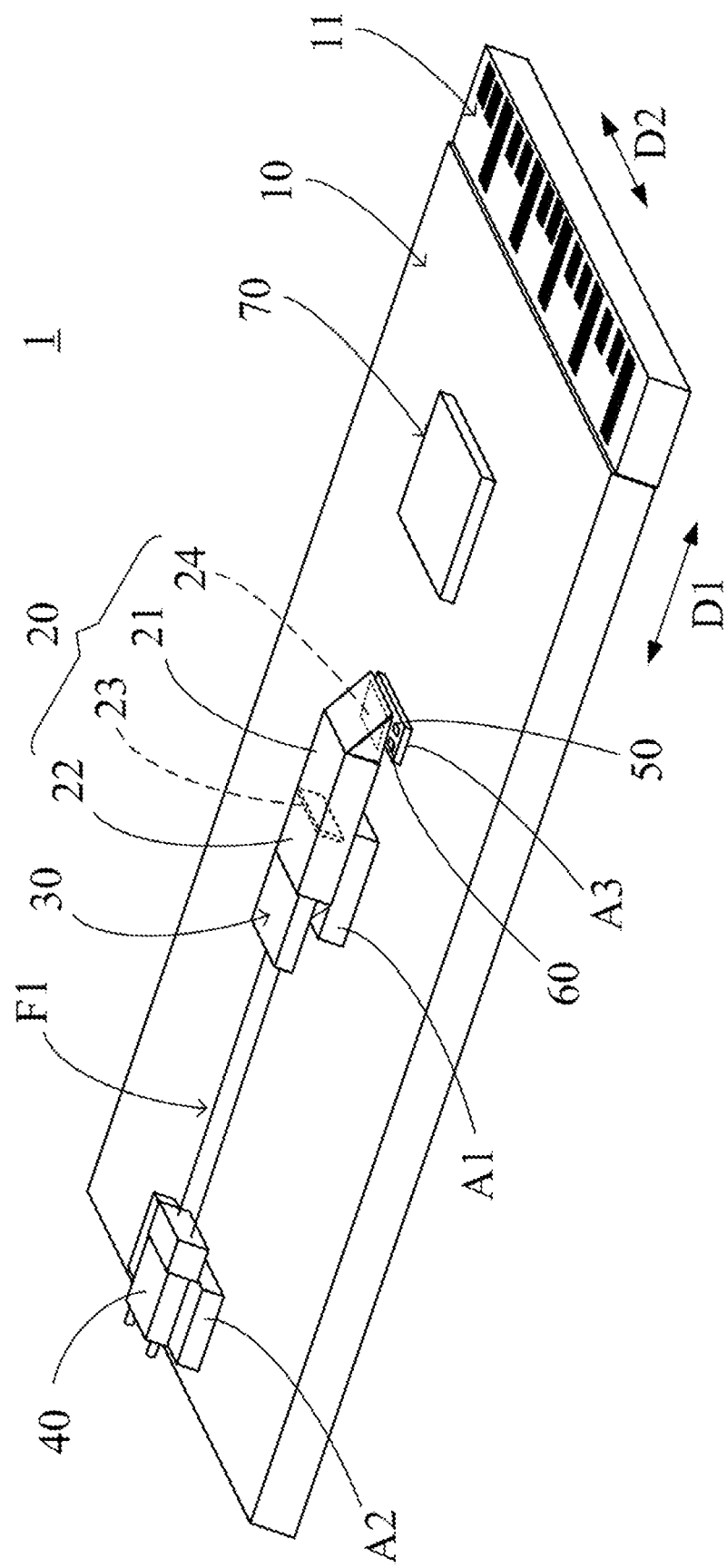
FIG. 1 is a perspective view of an optical communication module 1 in accordance with embodiments of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of embodiments and not by way of limitation in the figures of the accompanying drawings, in which like references indicate similar elements. It should be noted that references to "an" or "one" embodiment in this disclosure are not necessarily to the same embodiment, and such references mean "at least one."

The term "connected" is defined as directly or indirectly through intervening components. The connection can be such that the objects are permanently connected or releasably connected. The term "comprising," when utilized, means "including, but not necessarily limited to"; it specifically indicates open-ended inclusion or membership in the so-described combination, group, series, and the like.

Figure 2:
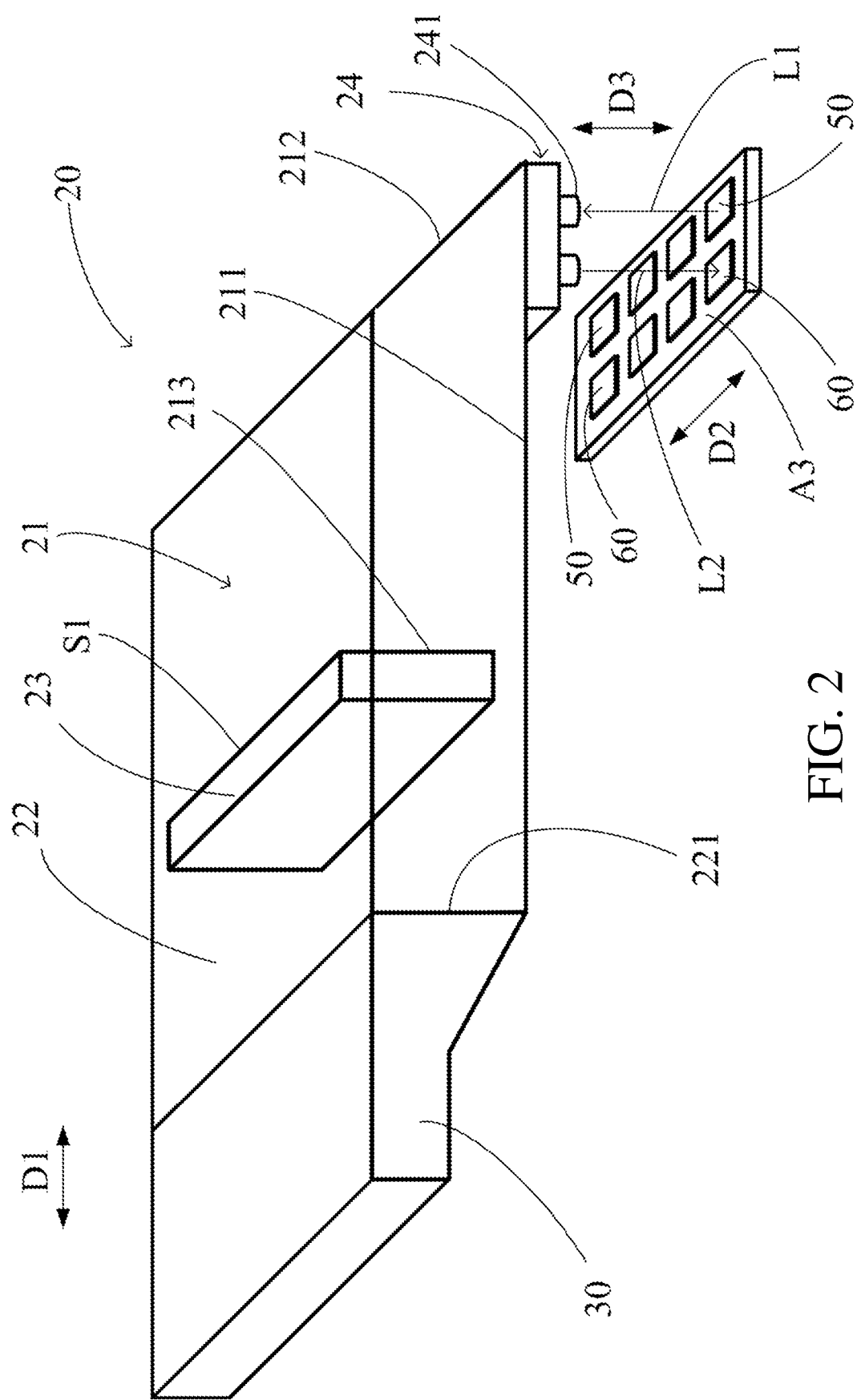
FIG. 2 is a perspective view of a light-guide structure 20 of the optical communication module 1 of FIG. 1

FIG. 1 is a perspective view of an optical communication module 1 in accordance with an embodiment of the present disclosure. FIG. 2 is a perspective view of a light-guide structure 20 of the optical communication module 1. The optical communication module 1 can be mounted in an electronic device (not shown in figures), so that the electronic device can transmit and receive optical signals. The electronic device can be a computer, a server, or a router, but is not limited thereto. In this embodiment, the optical communication module 1 may be an optical transmitting module. The optical communication module 1 may also receive electrical signals from the electronic device and convert the electrical signals to optical signals, and the optical signals can be transmitted out via an external optical fiber. Moreover, the optical communication module 1 can receive optical signals via the external optical fiber, convert the optical signals to electrical signals, and transmit the electrical signals to the electronic device.

In this embodiment, the optical communication module 1 may be a bidirectional optical transceiver. The optical communication module 1 includes a substrate 10, a light-guide structure 20, an optical-fiber base 30, an optical-fiber connector 40, one or more optical-signal transmitters 50, one or more optical-signal receivers 60, and a chip 70. The substrate 10 may be an elongated structure, extending in a transmission direction D1. In this embodiment, the substrate 10 may be a circuit board. The substrate 10 includes conductive pads 11 at one side of the substrate 10. In this embodiment, the conductive pads 11 may be edge connectors (golden fingers). One end of the substrate 10 can be inserted into an electrical connector of the electronic device, so that the conductive pads 11 can contact the electrical connector. Thereby, the optical communication module 1 can receive electrical signals from the electronic device via the conductive pads 11, or transmit electrical signals to the electronic device via the conductive pads 11.

The light-guide structure 20 is on the substrate 10, and extends in the transmission direction D1. In this embodiment, the light-guide structure 20 is affixed to the substrate 10 via the adjustment base A1. The height of the light-guide structure 20 relative to the substrate 10 can be adjusted by modifying the size of adjustment base A1. The adjustment base A1 can be affixed to the substrate 10 via glue. In some embodiments, the optical communication module 1 does not include the adjustment base A1, the light-guide structure 20 being directly disposed on the substrate 10.

The optical-fiber base 30 is on the substrate 10, and connected to the light-guide structure 20. The optical-fiber base 30 is used to fix at least one end of the optical fiber F1, so that one end of the optical fiber F1 is in contact with or adjacent to the light-guide structure 20. In this embodiment, the optical-fiber base 30 can fix multiple optical fibers F1. For the purpose of clarity, only two optical fibers F1 are drawn in FIG. 1, but the number of optical fibers F1 is not limited. In this embodiment, the number of optical fibers F1 is equal to the number of optical-signal transmitters 50 which is equal to the number of optical-signal receivers 60. The optical-fiber base 30 is connected to the light-guide structure 20, and can be affixed to the substrate 10 via the adjustment base A1. In some embodiments, the optical-fiber base 30 is affixed to the light-guide structure 20 by glue.

The optical-fiber connector 40 is on one side of the substrate 10, and is affixed to the substrate 10. As shown in FIG. 1, the optical-fiber connector 40 and the conductive pads 11 are at opposite sides of the substrate 10. The optical-fiber connector 40 is used to fix another end of the optical fiber F1. In this embodiment, the optical-fiber connector 40 may be a receptacle. The optical-fiber connector 40 can be used to connect the external optical fiber, and align the external optical fiber with the optical fiber F1. The optical-fiber connector 40 can be affixed to the substrate 10 by the holder A2. In this embodiment, the holder A2 is affixed to the substrate 10 by glue. In some embodiments, the optical communication module 1 does not include the holder A2, the optical-fiber connector 40 being directly affixed to the substrate 10 by welding or a buckle, not being limited to thereto.

The optical-signal transmitters 50 are disposed on the substrate 10, and are electrically connected to the substrate 10 or to the conductive pads 11. In this embodiment, the optical-signal transmitters 50 are between the substrate 10 and the light-guide structure 20, and configured to emit the output beams L1 to the light-guide structure 20. The optical-signal transmitters 50 are arranged in the arrangement direction D2. The arrangement direction D2 is parallel to the substrate 10, and is perpendicular to the transmission direction D1. In this embodiment, the optical communication module 1 has four optical-signal transmitters 50. However, the number of the optical-signal transmitters 50 is not limited. The optical communication module 1 may have one or more optical-signal transmitters 50.

In some embodiments, the optical-signal transmitter 50 can be a laser transmitter, such as a vertical-cavity-surface-emitting laser (VCSEL), but is not limited thereto. The optical-signal transmitter 50 can transmit a light beam with a single wavelength, such as a laser. In some embodiments, the optical-signal transmitter 50 may be a light emitting diode (LED).

The optical-signal receivers 60 are disposed on the substrate 10, and are electrically connected to the substrate 10 or to the conductive pads 11. In this embodiment, the optical-signal receivers 60 are between the substrate 10 and the light-guide structure 20, and adjacent to the optical-signal transmitters 50. The optical-signal receivers 60 are configured to receive input beams L2 from the light-guide structure 20, and convert optical signals to electrical signals. The optical-signal receivers 60 are arranged in the arrangement direction D2.

In this embodiment, the optical communication module 1 has four optical-signal receivers 60. However, the number of optical-signal receivers 60 is not limited thereto. The optical communication module 1 has one or more optical-signal receivers 60. In this embodiment, the optical-signal receiver 60 may be positive-intrinsic-negative diode (PIN diode), but is not limited thereto.

In this embodiment, the optical-signal transmitters 50 and the optical-signal receivers 60 are affixed to the supporting base A3, and arranged in an array on the supporting base A3. The supporting base A3 is affixed to the circuit board, and the optical-signal transmitters 50 and the optical-signal receivers 60 are electrically connected to the substrate 10 or to the conductive pads 11. In other words, the optical-signal transmitters 50 and the optical-signal receivers 60 are affixed to the substrate 10 by the supporting base A3. In this embodiment, the supporting base A3 accurately maintains a certain distance between the optical-signal transmitters 50 and the optical-signal receivers 60, thereby improving the communication quality of the optical communication module 1. Moreover, an optical module can be formed by pre-fixing the optical-signal transmitters 50 and the optical-signal receivers 60 on the supporting base A3, and the optical module then being installed on the substrate 10, saving production time.

The chip 70 is disposed on the substrate 10, and electrically connected to the substrate 10 or to the conductive pad 11. For the purpose of clarity, only one chip 70 is drawn in FIG. 1. However, the optical communication module 1 may have multiple chips 70 including different types of chip. In this embodiment, the chip 70 can be disposed on the substrate 10 by chips-on-board (COB) packaging. In some embodiments, the chip 70 is disposed on the substrate 10 by surface-mount technology (SMT).

The chip 70 may be control chip, monitor photodiode (MPD) chip and/or retimer chip, but is not limited thereto. The control chip is electrically connected to the optical-signal transmitter 50, and drives the optical-signal transmitter 50 to transmit the output beams L1 with optical signals. The MPD chip is electrically connected to the optical-signal transmitters 50, and can detect the power of the output beams L1 emitted by the optical-signal transmitters 50 and other characteristics. The retimer chip can be used to convert electrical signals to digital signals with clock signals.

In this embodiment, the electronic device can transmit electrical signals to the substrate 10 via the conductive pads 11. The optical-signal transmitters 50 emit output beams L1 with optical signals based on the electrical signals generated by the electronic device. The output beams L1 emitted by the optical-signal transmitters 50 enter into different optical fibers F1 via the light-guide structure 20. Different output beams L1 in the optical fibers F1 can be transmitted to the external optical fiber through the optical-fiber connector 40. Moreover, the input beams L2 in the external optical fiber can be input to different optical fibers F1 via the optical-fiber connector 40. The input beams L2 in the optical fibers F1 can enter the light-guide structure 20, and be emitted from the light-guide structure 20 and then fall onto different optical-signal receivers 60. The optical-signal receivers 60 convert the optical signals of the input beams L2 into electrical signals. After that, the electrical signals output by the optical-signal receivers 60 can be transmitted to the electronic device through the conductive pads 11.

In the present disclosure, the same light-guide structure 20 can be used to transmit multiple output beams L1 from the optical-signal transmitter 50 and receive multiple input beams L2 entering the optical-signal receiver 60, thereby saving the production cost and reducing physical size of the optical communication module 1. Moreover, the optical communication module 1 can use multiple optical fibers F1 to transmit optical signals, thereby improving the performance of the optical communication module 1.

As shown in FIG. 1 and FIG. 2, the light-guide structure 20 includes a first planar optical waveguide 21, a second planar optical waveguide 22, a birefringent crystal 23, and a lens-array structure 24. The first planar optical waveguide 21, the birefringent crystal 23, the second planar optical waveguide 22, and the optical-fiber base 30 are arranged in sequence in the transmission direction D1. Moreover, the first planar optical waveguide 21, the second planar optical waveguide 22, the birefringent crystal 23, and the lens-array structure 24 may be made of transparent materials.

The first planar optical waveguide 21 is above the substrate 10, and separated from the substrate 10. In this embodiment, the first planar optical waveguide 21 is separated from the optical-signal transmitter 50 and the optical-signal receiver 60. In other words, the optical-signal transmitter 50 and the optical-signal receiver 60 are between the substrate 10 and the first planar optical waveguide 21. The first planar optical waveguide 21 has a lower surface 211, a reflective surface 212, and a connection interface 213. The lower surface 211 faces the optical-signal transmitter 50 and the optical-signal receiver 60. The lower surface 211 extends parallel to the substrate 10 and/or the transmission direction D1. The reflective surface 212 is inclined relative to the lower surface 211, and configured to reflect the output beam L1 and the input beam L2. In this embodiment, the angle between the reflective surface 212 and the lower surface 211 is about 45 degrees. The connection interface 213 is connected to the birefringent crystal 23, and perpendicular to the substrate 10 and the transmission direction D1.

The second planar optical waveguide 22 is on the substrate 10, and connected to the first planar optical waveguide 21. The second planar optical waveguide 22 is affixed to the substrate 10 by the adjustment base A1, and is separated from the substrate 10. In this embodiment, the first planar optical waveguide 21 and the second planar optical waveguide 22 are integrally formed as a single structure. The first planar optical waveguide 21 and the second planar optical waveguide 22 form a receiving groove S1. In some embodiments, the second planar optical waveguide 22 is separated from the first planar optical waveguide 21, and connected to the birefringent crystal 23.

The second planar optical waveguide 22 has a joint surface 221. The joint surface 221 extends perpendicular to the transmission direction D1, and is parallel to the connection interface 213 of the first planar optical waveguide 21. In this embodiment, the optical-fiber base 30 is connected to the joint surface 221 of the second planar optical waveguide 22. Moreover, the optical fiber F1 may be in contact with or adjacent to the joint surface 221 of the second planar optical waveguide 22.

The birefringent crystal 23 is above the substrate 10, and separated from the substrate 10. The birefringent crystal 23 is connected to the first planar optical waveguide 21 and to the second planar optical waveguide 22, and is between them. In other words, the first planar optical waveguide 21 and the second planar optical waveguide 22 are on opposite sides of the birefringent crystal 23.

In this embodiment, the birefringent crystal 23 is disposed in the receiving groove S1. The birefringent crystal 23 extends perpendicular to the transmission direction D1. The birefringent crystal 23 may be calcite, quartz, or ruby, but is not limited thereto. The thickness of the birefringent crystal 23 is less in distance than the length of the first planar optical waveguide 21 and the length of the second planar optical waveguide 22, the thickness and the lengths being measured in one direction, such as the transmission direction D1.

The lens-array structure 24 is connected to the lower surface 211 of the first planar optical waveguide 21, and corresponds to the optical-signal transmitters 50 and the optical-signal receivers 60. The lens-array structure 24 faces the optical-signal transmitters 50 and the optical-signal receivers 60, and is separated from the optical-signal transmitters 50 and the optical-signal receivers 60. The lens-array structure 24 includes lenses 241 arranged in an array. Each of the lenses 241 corresponds to one optical-signal transmitter 50 or to one optical-signal receiver 60, but is separated therefrom.

In this embodiment, the optical-signal transmitters 50 and the optical-signal receivers 60 are located at the focal points of the lenses 241. The output beams L1 emitted by the optical-signal transmitters 50 enter into the first planar optical waveguide 21 via the lenses 241. The input beams L2 emitted by the first planar optical waveguides 21 are focused on the optical-signal receivers 60 via the lenses 241.

As shown in FIG. 1 and FIG. 2, the optical-signal transmitters 50 emit the output beams L1 to the first planar optical waveguide 21. The output beams L1 pass through the first planar optical waveguide 21, the birefringent crystal 23, and the second planar optical waveguide 22, and then enter into the optical fiber F1. Input beams L2 which are emitted by the optical fiber F1 pass through the second planar optical waveguide 22, the birefringent crystal 23, and the first planar optical waveguide 21, and then fall on the optical-signal receivers 60. In this embodiment, the wavelengths of the output beams L1 are different from the wavelengths of the input beams L2s.

Figure 3:
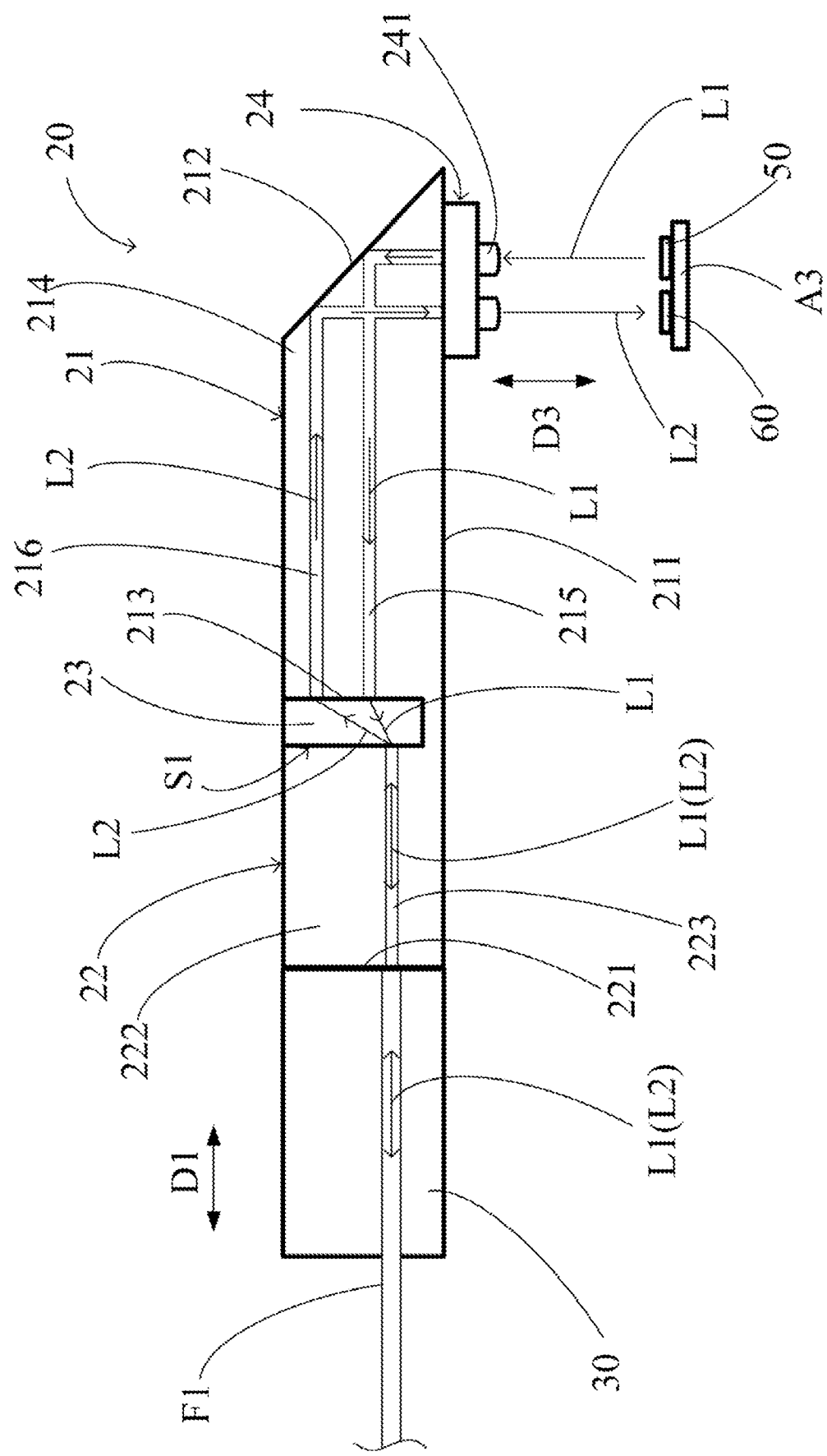
FIG. 3 is a schematic view of the light-guide structure 20 of FIG. 2.

FIG. 3 is a schematic view of the light-guide structure 20 of FIG. 2. As shown in FIG. 3, the first planar optical waveguide 21 includes a first light-guide body 214, and first and second optical channels 215 and 216. The first optical channels 215 and the second optical channels 216 are in the first light-guide body 214. The first optical channels 215 are connected to the lower surface 211, the reflective surface 212, and the connection interface 213. The first optical channels 215 between the lower surface 211 and the reflective surface 212 extend in the communication direction D3, and the first optical channels 215 between the reflective surface 212 and the connection interface 213 extend in the transmission direction D1. One end of each first optical channel 215 corresponds to the lenses 241 and to the optical-signal transmitters 50. The output beams L1 in the first planar optical waveguide 21 travel in the first optical channel 215.

The second optical channels 216 are connected to the lower surface 211, the reflective surface 212, and the connection interface 213. The second optical channels 216 between the lower surface 211 and the reflective surface 212 extend in the communication direction D3, and the second optical channels 216 between the reflective surface 212 and the connection interface 213 extend in the transmission direction D1. One end of each second optical channel 216 corresponds to the lenses 241 and the optical-signal receivers 60. The input beams L2 in the first planar optical waveguide 21 travel in the second optical channels 216. The materials and the particular refractive index of the second optical channels 216 may be the same as those of the first optical channels 215, but are not limited thereto.

In some embodiments, the materials and/or the refractive index of the second optical channels 216 are different from those of the first optical channels 215. In this embodiment, the materials and/or the refractive indexes of the first optical channels 215 and the second optical channels 216 are different from those of the first light-guide body 214. In some embodiments, the refractive indexes of the first optical channels 215 and the second optical channels 216 are greater than the refractive index of the first light-guide body 214.

The second planar optical waveguide 22 includes a second light-guide body 222 and main optical channels 223. The main optical channels 223 are disposed in the second light-guide body 222, and extend in the transmission direction D1. The main optical channels 223 correspond to the first optical channels 215 and the second optical channels 216. The output beams L1 and the input beams L2 in the second planar optical waveguide 22 travel in the main optical channels 223.

The materials and/or the refractive index of the main optical channels 223 may be the same as those of the first optical channels 215 (or of the second optical channels 216), but are not limited thereto. In this embodiment, the materials and/or the refractive index of the main optical channels 223 are different from those of the second light-guide body 222. In some embodiments, the refractive index of the main optical channels 223 is greater than the refractive index of the second light-guide body 222.

In this embodiment, the optical-signal transmitter 50 can emit the output beams L1 in the communication direction D3, the output beams L1 entering into the first optical channels 215 of the first planar optical waveguide 21 via the lower surface 211. In this embodiment, the communication direction D3 is perpendicular to the transmission direction D1. The output beams L1 travel in the first optical channel 215, and are reflected by the reflective surface 212. Afterwards, the output beams L1 in the first optical channels 215 travel in the transmission direction D1, and enters onto the birefringent crystal 23. The output beams L1 are refracted in the birefringent crystal 23, and enter into the main optical channels 223 of the second planar optical waveguide 22. Finally, the output beams L1 in the main optical channels 223 travel in the transmission direction D1, and enter into the optical fiber F1. The output beams L1 are transmitted to the external optical fiber via the optical fiber F1. In some embodiments, the output beams L1 emitted by the optical-signal transmitters 50 enter into the first planar optical waveguide 21 without passing through the lens-array structure 24.

Moreover, after the input beams L2 are emitted from the optical fiber F1, the input beams L2 enter into the main optical channels 223 of the second planar optical waveguide 22 via the joint surface 221. The input beams L2 in the main optical channels 223 travel in the transmission direction D1, and enter into the birefringent crystal 23. The input beams L2 are refracted in the birefringent crystal 23, and enter into the second optical channels 216 of the first planar optical waveguide 21. The input beams L2 in the second optical channels 216 travel in the transmission direction D1, and are reflected by the reflective surface 212. After the input beams L2 are emitted by the lower surface 211, the input beams L2 fall on the optical-signal receivers 60 in the communication direction D3 via the lens-array structure 24. In some embodiments, the input beam L2 falls onto the optical-signal receivers 60 without passing through the lens-array structure 24.

In this embodiment, the wavelength of the output beam L1 is different from the wavelength of the input beam L2, and the output beam L1 as refracted is different from the input beam L2 as refracted in the birefringent crystal 23. In this embodiment, the degree of refraction of the output beam L1 is less than the degree of refraction of the output beam L2 in the birefringent crystal 23. Therefore, the output beams L1 in the first optical channels 215, via the birefringent crystal 23, enter into the main optical channels 223, and the input beams L2 of the main optical channels 223, via the birefringent crystal 23, enter into the second optical channels 216. The optical communication module 1 thus performs bidirectional transmission and reception in one optical fiber F1.

In this embodiment, the wavelength of the output beam L1 is greater then the wavelength of the input beam L2. The wavelength of the output beam L1 is in a range from about 800 nm to 1000 nm. The wavelength of the input beam L2 is in a range from about 750 nm to 900 nm. The wavelength of the output beam L1 is greater than the wavelength of the input beam L2 by about 20 nm to 100 nm. For example, the wavelength of the output beam L1 is about 900 nm. The wavelength of the input beam L2 is about 850 nm. The wavelength of the output beam L1 is greater than the wavelength of the input beam L2 by 50 nm. Since the wavelength of the output beam L1 is greater than the wavelength of the input beam L2, there is less refraction of the output beam L1 in the birefringent crystal 23 than there is of the input beam L2. Therefore, the position or precise location of the output beam L1 of the first planar optical waveguide 21 on the lower surface 211 is different from the position or location of the input beam L2 of the first planar optical waveguide 21 on the lower surface 211.

In the light-guide structure 20, the optical-signal transmitters 50 and the optical-signal receivers 60 are disposed on the same substrate 10, and the position of the optical-signal transmitters 50 can be very close to the optical-signal receivers 60, simplifying the difficulty of manufacturing optical communication module 1. Moreover, the number of optical components and cost of the optical communication module 1 can be reduced.

Many details are often found in the art of optical communication modules. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. An optical communication module, comprising:
a first planar optical waveguide;
a birefringent crystal connected to the first planar optical waveguide;
a second planar optical waveguide connected to the birefringent crystal;
an optical fiber adjacent to the second planar optical waveguide;
an optical-signal transmitter configured to emit an output beam to the first planar optical waveguide, wherein the output beam passes through the first planar optical waveguide, the birefringent crystal, and the second planar optical waveguide in said sequence, and then enters into the optical fiber;
an optical-signal receiver adjacent to the optical-signal transmitter, and configured to receive an input beam, wherein the input beam emitted by the optical fiber passes through the second planar optical waveguide, the birefringent crystal, and the first planar optical waveguide in said sequence, and then falls on the optical-signal receiver; and
a substrate, wherein the optical-signal transmitter and the optical-signal receiver are disposed on the substrate, and between the substrate and the first planar optical waveguide, wherein the first planar optical waveguide, the birefringent crystal and the second planar optical waveguide are on the substrate, the birefringent crystal is between the first planar optical waveguide and the second planar optical waveguide, and the second planar optical waveguide is affixed to the substrate by an adjustment base.

2. The optical communication module as claimed in claim 1, wherein a wavelength of the output beam is different from a wavelength of the input beam.

3. The optical communication module as claimed in claim 1, wherein a thickness of the birefringent crystal is less then a length of the first planar optical waveguide and a length of the second planar optical waveguide, wherein the thickness and the lengths are measured in the same direction.

4. The optical communication module as claimed in claim 1, further comprising: a lens-array structure disposed on a lower surface of the first planar optical waveguide, and facing the optical-signal transmitter and the optical-signal receiver.

5. An optical communication module, comprising:
a first planar optical waveguide;
a birefringent crystal connected to the first planar optical waveguide;
a second planar optical waveguide connected to the birefringent crystal;
an optical fiber adjacent to the second planar optical waveguide;
an optical-signal transmitter configured to emit an output beam to the first planar optical waveguide, wherein the output beam passes through the first planar optical waveguide, the birefringent crystal, and the second planar optical waveguide in said sequence, and then enters into the optical fiber; and
an optical-signal receiver adjacent to the optical-signal transmitter, and configured to receive an input beam, wherein the input beam emitted by the optical fiber passes through the second planar optical waveguide, the birefringent crystal, and the first planar optical waveguide in said sequence, and then falls on the optical-signal receiver,
wherein the first planar optical waveguide comprises a lower surface, a reflective surface, and a connection interface, wherein the lower surface faces the optical-signal transmitter and the optical-signal receiver, the reflective surface is inclined relative to the lower surface, and configured to reflect the output beam and the input beam, and the connection interface is connected to the birefringent crystal.

6. The optical communication module as claimed in claim 5, wherein the first planar optical waveguide comprising:
a first optical channel connected to the lower surface, the reflective surface, and the connection interface; and
a second optical channel connected to the lower surface, the reflective surface, and the connection interface;
wherein the output beam in the first planar optical waveguide travels in the first optical channel, and the input beam in the first planar optical waveguide travels in the second optical channel.

7. The optical communication module as claimed in claim 6, wherein the second planar optical waveguide comprises a main optical channel corresponding to the first optical channel and the second optical channel, wherein the output beam and the input beam in the second planar optical waveguide travel in the main optical channel.

8. An optical communication module, further comprising:
a first planar optical waveguide;
a birefringent crystal connected to the first planar optical waveguide;
a second planar optical waveguide connected to the birefringent crystal;
an optical fiber adjacent to the second planar optical waveguide;
an optical-signal transmitter configured to emit an output beam to the first planar optical waveguide, wherein the output beam passes through the first planar optical waveguide, the birefringent crystal, and the second planar optical waveguide in said sequence, and then enters into the optical fiber;
an optical-signal receiver adjacent to the optical-signal transmitter, and configured to receive an input beam, wherein the input beam emitted by the optical fiber passes through the second planar optical waveguide, the birefringent crystal, and the first planar optical waveguide in said sequence, and then falls on the optical-signal receiver; and
an optical-fiber base connected to the second planar optical waveguide, and configured to affix to an end of the optical fiber; and
an optical-fiber connector affixed to another end of the optical fiber.

* * * * *